US006556976B1

(12) United States Patent
Callen

(10) Patent No.: US 6,556,976 B1
(45) Date of Patent: Apr. 29, 2003

(54) METHOD AND SYSTEM FOR E-COMMERCE AND RELATED DATA MANAGEMENT, ANALYSIS AND REPORTING

(75) Inventor: Kevin Callen, Falls Church, VA (US)

(73) Assignee: Gershman, Brickner and Bratton, Inc., Fairfax, VA (US)

(*) Notice: Subject to any disclaimer, the term of this patent is extended or adjusted under 35 U.S.C. 154(b) by 0 days.

(21) Appl. No.: 09/437,787

(22) Filed: Nov. 10, 1999

(51) Int. Cl.⁷ .............................................. G06F 17/60
(52) U.S. Cl. ........................................... 705/37; 705/26
(58) Field of Search ............................. 705/26, 27, 37

(56) References Cited

U.S. PATENT DOCUMENTS

| | | |
|---|---|---|
| 4,984,155 A | 1/1991 | Geier et al. |
| 5,136,501 A | 8/1992 | Silverman et al. |
| 5,351,186 A | 9/1994 | Bullock et al. |
| 5,493,490 A | 2/1996 | Johnson |
| 5,664,115 A | 9/1997 | Fraser |
| 5,717,989 A | 2/1998 | Tozzoli |
| 5,758,328 A | 5/1998 | Giovannoli |
| 5,790,426 A | 8/1998 | Robinson |
| 5,794,212 A | 8/1998 | Mistr, Jr. |
| 5,832,459 A | 11/1998 | Cameron et al. |
| 5,842,178 A | 11/1998 | Giovannoli |
| 5,862,223 A | 1/1999 | Walker et al. |
| 5,873,071 A | 2/1999 | Ferstenberg |
| 5,918,219 A | 6/1999 | Isherwood |
| 5,924,082 A | 7/1999 | Silverman et al. |
| 5,924,083 A | 7/1999 | Silverman et al. |
| 6,023,683 A * | 2/2000 | Johnson et al. ............... 705/26 |
| 6,081,789 A * | 6/2000 | Purcell ........................ 705/37 |

FOREIGN PATENT DOCUMENTS

| | | |
|---|---|---|
| JP | 5412255 | 3/1979 |
| JP | 360151781 A * | 8/1985 |

OTHER PUBLICATIONS

"About Us," http://www.bidtoprint.com, 2 pages from Bidtoprint.com, retrieved from the internet on Jun. 7, 2002.*

* cited by examiner

*Primary Examiner*—Robert P. Olszewski
*Assistant Examiner*—Andrew J. Fischer
(74) *Attorney, Agent, or Firm*—Richard C. Litman

(57) ABSTRACT

A system transacting e-commerce and related data management, analysis and reporting includes a database, first and second clients, and first through fourth servers communicatively connected to an internet network. The database stores a variety of information relating to customers and has a cost reduction database portion storing cost reduction information. The first and second client have access to the on-line system. The first server maintains a commercial website. The second server supports a consultant interface on the internet network. The third server imports financial information into the database. The fourth server receives purchasing and financial information. The filter generates purchasing options and calculates a purchase price. A first program dynamically displays a cost reduction list. A second program analyzes a customer's purchasing history for cost effectiveness and forecasts future plans for improved purchasing implementation. A default pricing mechanism selectively uses default pricing values to generate a bid.

9 Claims, 6 Drawing Sheets

METHOD AND SYSTEM FOR E-COMMERCE AND RELATED DATA MANAGEMENT, ANALYSIS AND REPORTING

BACKGROUND OF THE INVENTION

1. Field of the Invention

The present invention relates generally to an on-line shopping support method and system using communication networks, and more particularly to a method and system for transacting e-commerce and related data management, analysis, and reporting.

2. Description of the Related Art

Buyers in need of goods and services often spend considerable time locating an appropriate vendor. Buyers use trade publications, directories, recommendations, and other means to locate vendors. If the type of vendor needed is in a foreign country, the problem compounds. Vendors advertise through various media and by direct sales methods to make known to potential buyers what they sell and how to contact them. Once a buyer identifies a few vendors, each must be contacted to obtain product or service, price and availability information. This is a time consuming process and companies typically rely on experience purchasing staff to accomplish it. In addition, when buyers must sell surplus inventory from time to time, they must advertise, cold call, sell to brokers or the like. These processes are costly and time consuming for most businesses.

The prior art describes computerized shopping systems which employ some kind of central database of goods and services offered to buyers. Information about the goods and services offered is stored centrally and must be kept current centrally. The volume of information required to be maintained and updated in a central database system restricts it to a limited type or number of goods and services or number of vendors it can offer. It is not feasible for such systems to provide access to all standard goods and services and all suppliers world wide. For such a central database to exist, the amount of information to be stored would be awesome as would be the task of keeping it current. It simply is not feasible for central database systems to satisfy the need of buyers to receive timely quotes on an enormous variety of goods and services from vendors anywhere in the world. For this reason, existing centralized database systems are created and maintained by the one or few vendors whose goods and prices are displayed. These systems necessarily restrict a buyer's choice of vendors.

These systems are like electronic supermarkets which are owned by a single company or an association of suppliers. In such systems, a vendor provides its database of goods and/or services to a buyer who orders items from the vendor's database. It is analogous to walking into a vendors store and selecting items from the vendors available stock. Another such system is analogous to shopping in a mall. In this case a number of (complementary) vendors combine to offer their collective inventory to the buyer through individual databases or a combined database of available goods or services. In yet another existing system, a primary, seller, such as an insurance agency, offers to provide buyers premium quotations from the insurance carriers for which the agency is an agent.

In all of the above cases, the vendors responding to the buyers request regarding a particular good or service are either the service provider or a vendor with whom the service provider is involved in another business relationship such as advertisers in a common publication or affiliated insurance carrier. These select vendors provide the product and pricing information supplied by the system to buyers. These systems have no capacity to offer an unlimited number of goods and services from any number of vendors who wish to become members of the system. This would require an unrealistically large central database containing information about products, services and vendors. Each vendor would be required to provide detailed information to the central database about its product lines and would be required to update them daily. Accordingly, existing systems are very specialized electronic buying services with a limited selection of goods, services, and vendors. In addition, buyers wishing to sell surplus inventory from time to time cannot use these systems for that purpose.

In a conventional on-line shopping system using a personal computer based communication network or the like, a service offering side (or merchandise selling side) supplies merchandise information in response to a merchandise search request.

As on-line shopping using multimedia and networks prevails, a variety of merchandise such as daily necessities is sold on-line. Users buy a variety of merchandise at a considerable frequency through on-line shopping. In conventional on-line shopping, however, the service offering side provides merchandise information in a uniform menu style, and is unable to provide services suitable for user specific needs or conditions. On the service user side, merchandise information is searched by using a uniform menu. Therefore, as daily necessities or the like are bought at a considerable frequency, it can be anticipated some merchandise may sometimes be forgotten at the time of a purchase.

Several patents are illustrative of known technology for enabling a user to acquire goods or services while operating on-line. For example, U.S. Pat. No. 4,984,155, issued on Jan. 8, 1991 to Raymond R. Geier et al., describes a system for enabling a customer to operate a data terminal for placing an order for goods or services from a supplier, the data terminal displays information about the goods or services being ordered to complete, correct or update information available from the supplier's catalog.

U.S. Pat. No. 5,136,501, issued on Aug. 4, 1992 to David L. Silverman et al., describes a matching system for trading instruments in which bids are automatically matched against offers for given trading instruments for automatically providing matching transactions in order to complete trades for the given trading instruments, includes a host computer means comprising means for anonymously matching active bids and offers in the system by trading instrument based on a variable matching criteria, which comprises a counterpart credit limit between counterparts to a potential matching transaction.

U.S. Pat. No. 5,351,186, issued on Sep. 27, 1994 to Wayne J. Bullock et al. describes a system and method for obtaining information concerning a product or a service to a user which includes a remotely located source of computer-based information for generating and transmitting encoded data, including encoded audio data, pertaining to a plurality of products or services.

U.S. Pat. No. 5,493,490, issued on Feb. 20, 1996 to Jerome D. Johnson, describes an electronic system for creating customized product proposals stores a plurality of pictures and text segments to be used as building blocks in creating the proposal.

U.S. Pat. No. 5,664,115, issued on Sep. 2, 1997 to Richard Fraser, describes a method and apparatus for automatically matching, sellers of property with potential buyers through a communications network (preferably the Internet) in which a host system communicates with the sellers and the potential buyers over telephone or dedicated data transmission lines.

U.S. Pat. No. 5,717,989, issued on Feb. 10, 1998 to Guy Frederick Tozzoli et al., describes a system that stores criteria specified by a funder relating to trade transactions for buyers and sellers. The system compares the criteria with a proposed purchase order to determine whether the system can generate a payment guarantee on behalf of the funder for the buyer to the seller.

U.S. Pat. No. 5,758,328, issued on May 26, 1998 to Joseph Giovannoli, describes a computer system forming a computer based communications network of network members inclusive of network buyers and or network vendors for processing requests for quotation for goods and services through at least one central processing unit including operating system software for controlling the identification of network members, means for network buyers to generate request for quotation for goods and/or services, means for transmitting said request for quotation to said central processing unit, filter means for selecting appropriate network members to receive said request for quotation based on filter conditions defined by the buyer in said request for quotation and/or by the vendor and/or by the central processing unit, means for broadcasting said request for quotation to the network members selected by said filter means and means for responding to the generator of said request quotation with either a response to said, request for quotation or with a list of said selected network members. Filter conditions may define the class of vendors in terms of geographical location, quantity, language spoken, currency, special conditions of sale, and the like.

U.S. Pat. No. 5,790,426, issued on Aug. 4, 1998 to Gary B. Robinson, describes an automated collaborative filtering (ACF) system for recommending at least one item to a first user based on similarity in preference of the user as compared with other users. The ACF system stores rating data for items provided by users of the system.

U.S. Pat. No. 5,794,212, issued on Aug. 11, 1998 to Alfred F. Mistr, Jr., describes a method for providing more efficient communication between energy suppliers, energy purchasers, and transportation providers and having an administrator to assist in the transmission of energy as necessary for providing timely movement of energy as necessary for providing timely movement of energy.

U.S. Pat. No. 5,832,459, issued on Nov. 3, 1998 to Paul Scott Cameron et al., describes a computerized source searching system and method for the placement of an order for at least one offer via a terminal having a display.

U.S. Pat. No. 5,842,178, issued on Nov. 24, 1998 to Joseph Giovannoli, describes a computerized system for forming a computer based communications network of network members inclusive of network buyers and or network vendors for processing request for quotation for goods and services through at least one central processing unit including operating system software for controlling the central processing unit, storage means containing the identification of network members, means for network buyers to generate request for quotation for goods and/or services, means for transmitting said request for quotation to said central processing unit, filter means for selecting appropriate network members to receive said request for quotation based on filter conditions defined by the buyer in said request for quotation and/or by the vendor and/or by the central processing unit, means for broadcasting said request for quotation to the network members selected by said filter means and means for responding to the generator of said request for quotation with either a response to said request for quotation or with a list of said selected network members. Filter condition may define the class of vendors in terms, of geographical location, quantity, language spoken, currency, special conditions of sale, and the like.

U.S. Pat. No. 5,862,223, issued on Jan. 19, 1999 to Jay S. Walker et al. describes an expert matching method and apparatus for managing communications between an expert having particular qualifications and an end user seeking a solution to an expert request.

U.S. Pat. No. 5,873,071, issued on Feb. 16, 1999 to Robert A. Ferstenberg et al., describes software processes distributed on one or more computer systems that exchange messages in order to facilitate an intermediated exchange of financial commodities between a plurality of exchange of financial commodities between a plurality of participants.

U.S. Pat. No. 5,924,082, issued on Jul. 13, 1999 to David L. Silverman et al., describes a negotiated matching system that includes a plurality of remote terminals associated with respective potential counterparts, a communications network for permitting communication between the remote terminals, and a matching station. Each user enters trading information and ranking information into his or her remote terminal. The matching station then uses the trading and ranking information from each user to identify transactions between counterparts that are mutually acceptable based on the ranking information, thereby matching potential counterparts that are mutually acceptable based on the ranking, information, thereby matching potential counterparts to a transaction.

U.S. Pat. No. 5,924,083, issued on Jul. 13, 1999 to David L. Silverman et al., describes a distributed electronic trading system for displaying a real-time credit filtered view of at least one market in which financial instruments are traded in which the market view includes a predetermined number of orders currently available to a viewing trading entity based upon one or more credit limits entered by the viewing trading entities and/or other trading entities in the system includes a host for receiving and storing orders and credit information entered by a plurality of trading entities including the viewing trading entity, for transmitting the orders and predetermined display parameters, and for selectively transmitting the credit information; a plurality of intelligent nodes linked to the host; and a plurality of key stations respectively linked to one or more of the intelligent nodes.

Japanese Pat. No. 54-127255, issued on Mar. 10, 1979 describes an on-line network system for information on used car stock registration.

However, none of the aforementioned inventions describe a method and system for transacting e-commerce and related data management, analysis, & reporting that includes a filtering means for generating purchasing options based expert criteria, as purchasing price calculation, and filtering input data. None of the aforementioned inventions describe a method and system for transacting e-commerce and related data management, analysis, & reporting that incorporates a cost reduction program for dynamically generating a list of cost reduction options tailored for a particular type of customer. Moreover, none of the aforementioned inventions describe a method and system for transacting e-commerce and related data management, analysis, & reporting having default vendor pricing options for enabling vendors to selectively use default pricing values in their bids.

None of the above inventions and patents, taken either singularly or in combination, is seen to describe the instant invention as claimed. Thus a method for transacting e-commerce and related data management, analysis, & reporting solving the aforementioned problems is desired.

SUMMARY OF THE INVENTION

The present invention is a method and system for transacting e-commerce and related data management, analysis, & reporting. A database is communicatively connected to an internet network for enabling customers to store a variety of information relating to themselves. The database has a cost reduction database portion for storing information relating to cost reduction options. At least one first client is communicatively connected to the internet network for enabling a customer to access the on-line system. At least one second client is communicatively connected to the internet network for enabling a vendor to obtain access to the same on-line system. At least one first server is communicatively connected to the internet network for maintaining a commercial website. At least one second server is communicatively connected to the internet network for supporting a consultant interface on the internet network. A third server is communicatively connected to the internet network for enabling the predefined customers to import financial information into the database. A fourth server is communicatively connected to the internet network for enabling users to transmit purchasing and financial information to said. fourth server via the internet network. A filtering means is used for generating purchasing options by filtering a customer's information with expert criteria, calculating a purchase price, and filtering the customer's information with vendor offerings. A first programmed means is used for dynamically displaying a list of cost reduction options tailored to an applicable class of customers. A second programmed means is used for analyzing a customer's purchasing history for cost effectiveness and for forecasting future plans for improved purchasing implementation. A default pricing means is used for selectively using default pricing values to generate a bid.

Accordingly, it is a principal object of the invention to provide a method and system for transacting e-commerce and related data management, analysis, & reporting that has a filtering means for selecting purchasing options based on expert criteria, purchasing price calculation, and filtering input data.

It is another object of the invention to provide a method and system for transacting e-commerce and related data management, analysis, & reporting that utilizes a cost reduction program for dynamically producing a list of cost reduction options tailored for a particular type of customer.

It is a further object of the invention to provide a method and system for transacting e-commerce and related data management, analysis, & reporting that has default pricing options for vendors to facilitate bidding by vendors.

Still another object of the invention is to provide a method and system for transacting e-commerce and related data management, analysis, & reporting that includes a processing means for conducting purchasing and cost reduction analysis and forecasting.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
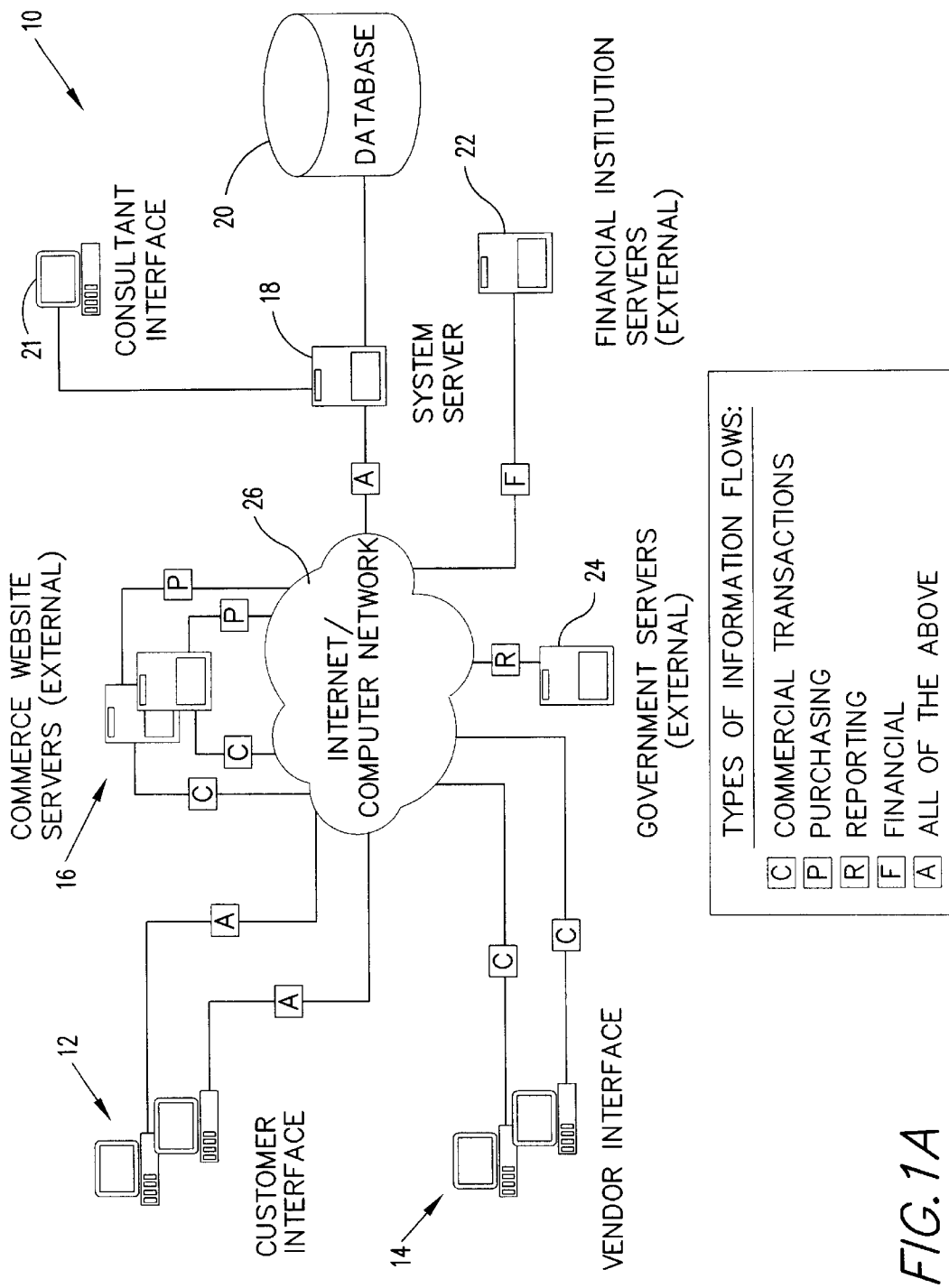
FIG. 1A is a block diagram of a preferred e-commerce and related data management, analysis, and reporting system according to the present invention.
Figure 1B:
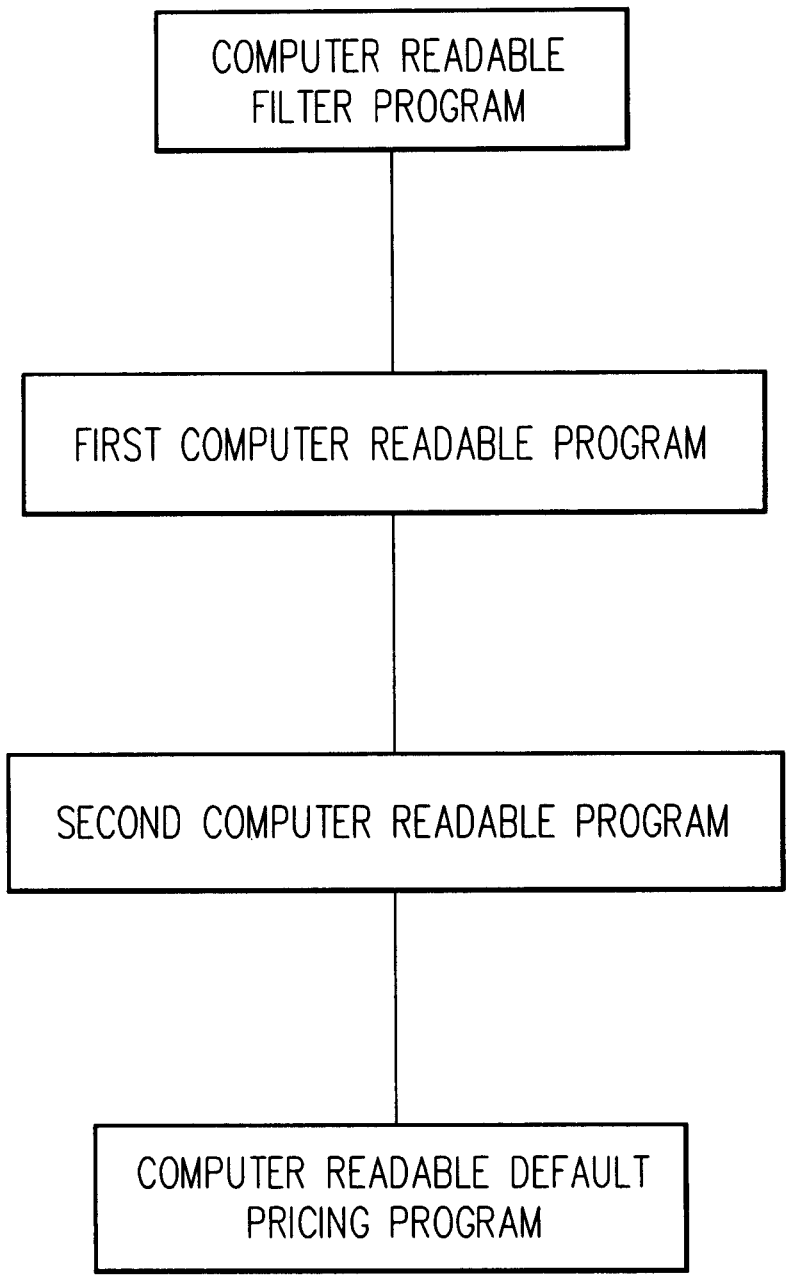
FIG. 1B is a block diagram of the programming elements according to the present invention.

The present invention is a method and system for transacting e-commerce and related data management, analysis, & reporting. A preferred system (hereinafter referred to as "the on-line system") 10 for implementing the present invention is illustrated in FIG. 1. As illustrated, the on-line system 10 preferably includes at least one first client (hereinafter referred to as the "customer interface") 12 for providing system access to a customer, at least one second client (hereinafter referred to as the "vendor interface") 14 for providing system access to a vendor, at least one first server (hereinafter referred to as a "commercial website server") 16 for maintaining a commercial website, at least one second server (hereinafter referred to as a "system server") 18 for supporting a consultant interface, a database 20 for storing customer purchasing and income information, a consultant interface 21 for providing assistance to users in proper use of the on-line system 10, at least one third server (hereinafter referred to as a "financial institution server) 22, at least one fourth server (hereinafter referred to as a "government server") 24 for providing on-line access to government reports, and an internet network 26 interconnecting each of the aforementioned components of the on-line system 10 for communicatively linking each component of the system 10.

The customer interface(s) 12 serves to enable a customer to access the customer's individual purchasing information at any time over the internet network 26. A customer's purchasing information is only accessible by the system server 18 and the customer to which the purchasing information pertains.

The vendor interface 14 is preferably used for selling items through the system server 18 over a commercial website. The vendor interface 14 also serves to enable a vendor to store sales information on the database 20. A vendor's sales information is accessible anytime via the internet network 26, however a vendor's individual sales information is only accessible by a customer and by the system server 18.

The commercial website server 16 serves to enable customers to transact commerce over the internet network 26. Purchasing information from such commercial transactions is imported into the database 20 for storage.

The system server 18 serves to support a website for conducting on-line commerce. The database 20 is communicatively, connected to the system server 18 by conventional means for enabling customers to access their own purchasing information when using the on-line system 10. According to the present invention, a customer's individual purchasing information is accessible via the internet network 26 at any time, however, this information is only accessible by the customer and the system server 18.

The database 20 preferably comprises a customer database 20*a* for storing various information relating to a particular customer, a vendor database 20b for storing information relating to a particular vendor, and a cost reduction expert database 20c for storing various information relating to cost reduction options.

The consultant interface 21 is a real person who provides on-line assistance to customers and vendors in using the on-line system 10. When users of the on-line system 10 have a need to fill out forms, a split screen may be presented at the customer or vendor interface-one side of a screen may consist of a chat room and the other side may consist of a form being filled out. Preferably, a customer or vendor may seek assistance at anytime.

The financial institution server 22 is communicatively connected by conventional means to the internet network 26 for enabling users of the financial institution server 22 to import financial and purchasing information into the database 20. The financial information may be formatted into government reports to be sent to the government server 24.

The government server(s) 24 is communicatively connected by, conventional means to the internet network 26 for enabling users of the on-line system 10 to transmit purchasing and financial information via the internet to the government server(s) 24.

A preferred computer process for implementing the present, invention will now be described. A flow chart of the preferred process is shown in FIG. 2.

The Customer Purchasing Area (See "Customer Purchasing Area 28, FIGS. 2A–2D). As shown, the first step in using the present invention is that a customer inputs a variety of customer-related information into a customer database. Preferably, the customer, will input the following information into a customer database 20a

1. contact information;
2. locational information, such as the local government jurisdiction;
3. information relating to the customer's organization, such as an applicable business sector or the number of employees;
4. depending on the information provided up to this point, the on-line system may prompt the customer for additional information relating to operations, such as handling of food, waste if the customer is a restaurant;
5. information regarding the customer's purchasing history, such, as the name of the current vendor used, the price paid, and the services or goods provided;
6. information relating to any suggestions for improving purchasing to better meet the customer's needs at reduced cost (e.g., information relating to problems with a current vendor, undesirable vendors, availability of capital, time, facility space, etc.);
7. additional information based on earlier answers provided in this input section or based on a vendor database 20b; and
8. information on contract and billing preferences, such as length of contract or method of payment information.

The second step of the preferred process is the generation of purchasing options by filtering the aforementioned inputted information with expert criteria, calculation of a purchasing price, and filtering the inputted information with vendor offerings. The generated purchasing options are then recorded in the customer database 20a.

The expert criteria is directed to the customer's applicable category of consumption (e.g., restaurant, residence, steel factory, etc.) and will accordingly generate purchasing options directed towards that category. For example, a grocery store may produce a substantial volume of cardboard waste and may lack adequate property space to accommodate a dumpster for disposal of the waste. In such a case, the expert criteria might suggest a bailer as a solution to the disposal problem. Although possibly more expensive than the cost for a dumpster, use of the expert criteria might suggest that use of a bailer to be a more effective means for condensing the cardboard waste than use of a compactor, for example.

Similarly, where a grocery store uses fluorescent lighting that is not very energy efficient, the expert criteria can propose the purchase of a more energy efficient brand of lighting to reduce energy cost.

The purchasing price calculation is used when no vendor prices are available in the vendor database 20b. The aforementioned inputted information and statistics from the vendor database 20b are used to estimate a purchase price for exercising a particular-purchasing option. For example, given an average landfill price of $57.00/ton in Delaware, a customer requirement of 2 tons/week of waste, and a travel distance of 30 miles to a landfill, a standard formula for transportation rates and collection and disposal costs, may be used to generate an estimated cost for disposing of the waste. Alternatively, if the vendor database 20b contains adequate information of past cost incurred by using a particular vendor, this information may be used to calculate an estimated, cost for the applicable goods or services and to identify the best purchasing options for the customer.

Customer Choosing a Purchasing Option. The third step of the preferred process involves the customer choosing a purchasing option. The customer may either choose to directly make a purchase for desired goods or services, use a bidding process to obtain the goods or services, or utilize a cost reduction program. In certain cases, only a single choice will be provided for obtaining the desired goods or services. For example, where no cost reduction-options exist for reducing costs and where bidding is unavailable as an option by vendors to obtain a particular item (e.g., a toothbrush). It should be noted, however, that the consultant interface 21 may monitor the customer's transactions relating to a particular process of the on-line system 10 and may make, modifications to the computer generated purchasing options. The consultant interface 21 is available to customers and vendors at all times for assistance in guiding them through any process of the on-line system 10.

The Cost Reduction Program. The fourth step of the preferred process is the displaying of cost reduction options by a cost reduction program. The on-line system 10 dynamically displays a list of cost reduction options directed to an applicable customer category (e.g., SIC code) or other factors (e.g., the number of employees). For example, a cost reduction option may identify an activity, method or material needed, a typical implementation cost human resources required, and a time frame. The customer may then choose which cost reduction task they wish to proceed with. The consultant interface 21 may be used by an on-line consultant to answer questions for assisting a customer in choosing the best option for its particular requirements.

Next, the customer must fill in an implementation plan. This step requires the customer to identify its resource and schedule requirements. Conflicts identified relating to resources or, scheduling will generate error messages and require the customer to reschedule, obtain additional resources, or make other appropriate changes. The cost reduction program utilizes information from both the customer database 20a and the cost reduction expert database 20c. Data generated by the cost reduction program is stored in the customer database 20a.

Provided below is an example of the cost reduction task options that would be provided for a textile industry wanting to reduce waste generation.

Textile Industry

Many textile industries are able to significantly reduce or even eliminate waste-related costs. Provided below is a list of actions that have proven feasible and successful in reducing waste in the textile industry. You may select general areas for investigation and inclusion in your Cost Reduction Program.

| Task | Include |
| --- | --- |
| Modify rug processing equipment to accommodate narrower production runs | |
| Investigate waste prevention opportunities in flock fiber waste, circular knit nap, and shear waste. | |
| Reduce cotton waste generated in carding department. | |
| Reduce cutting and sewing trim waste through weaving modifications, operator awareness, and inventory control. | |
| Take yarn cones back from customers and reuse. | |
| Use stackable and returnable pallets for yarn shipments. | |
| Reuse starch and size waste internally. | |
| Reuse quills and filling spools. | |
| Make pallet covers from scrap cloth. | |
| Compost waste fiber from utilization plant. | |
| Develop packaging material from waste generated internally. | |
| Use fiber waste to make insulator pads. | |

Provided below is an example of the cost reduction task options that would be provided for implementing a food waste reduction program. The cost reduction task options also would include the project management information that is needed.

Would you like to add a food waste reduction program? Yes/no.

If yes, which opportunity(s) would you like to investigate:
  (a) Cafeteria food scraps for animal feed
  (b) Served (restaurant or institution) food scraps for animal feed.
  (c) Excess non-perishable food for food bank donation.
  (d) Excess prepared and perishable food for donation.

Select deadline.

Project Management

Amount of time to investigate donor programs and/or interested livestock farmers? Two weeks is recommended. 1–8 weeks Amount of time to train food handlers to separate and store donatable food waste. Four weeks is typically recommended. 1–16 weeks Regarding food scraps from a cafeteria amount of time to educate employees on separating donatable food to separate containers? Twelve weeks is typically recommended. 1–52 weeks.

Project start date?

Thereafter, the customer enters a bidding process, which is explained below. The bidding process interacts significantly with the Vendor Pricing Area represented in FIG. 2C.

Figure 2A:
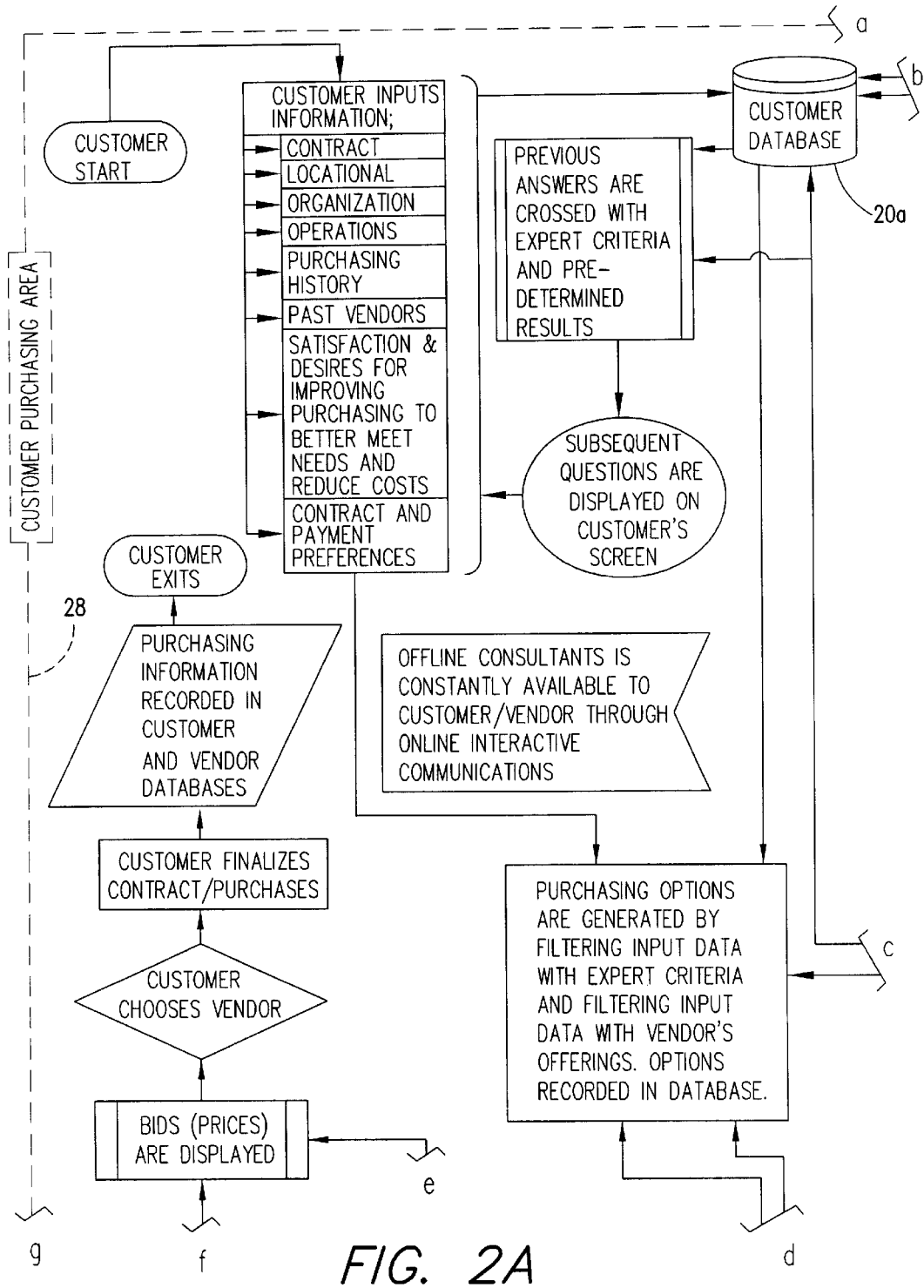
FIGS. 2A–2D is a flow diagram of a preferred process for implementing the present invention.
Figure 2B:
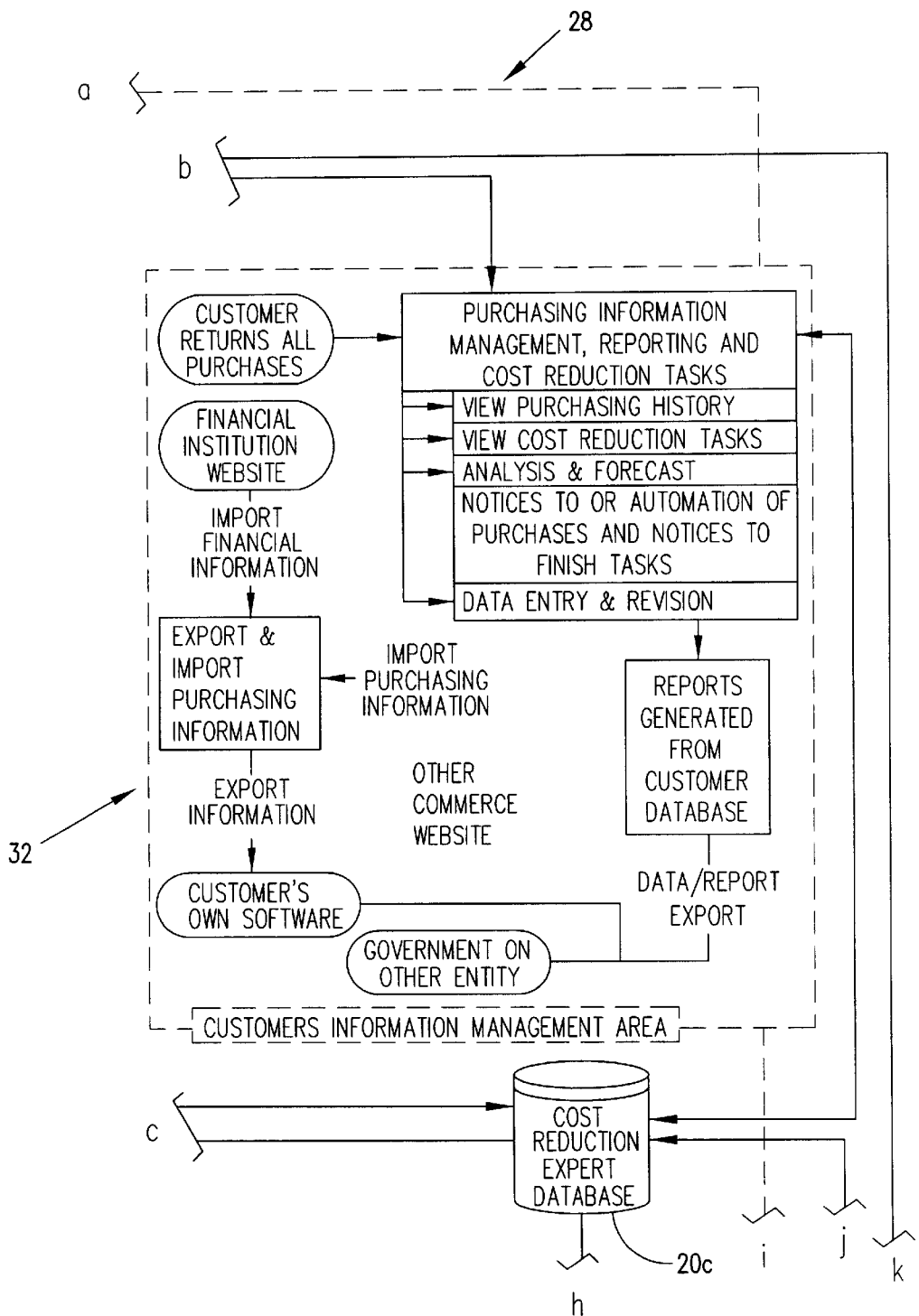
Figure 2C:
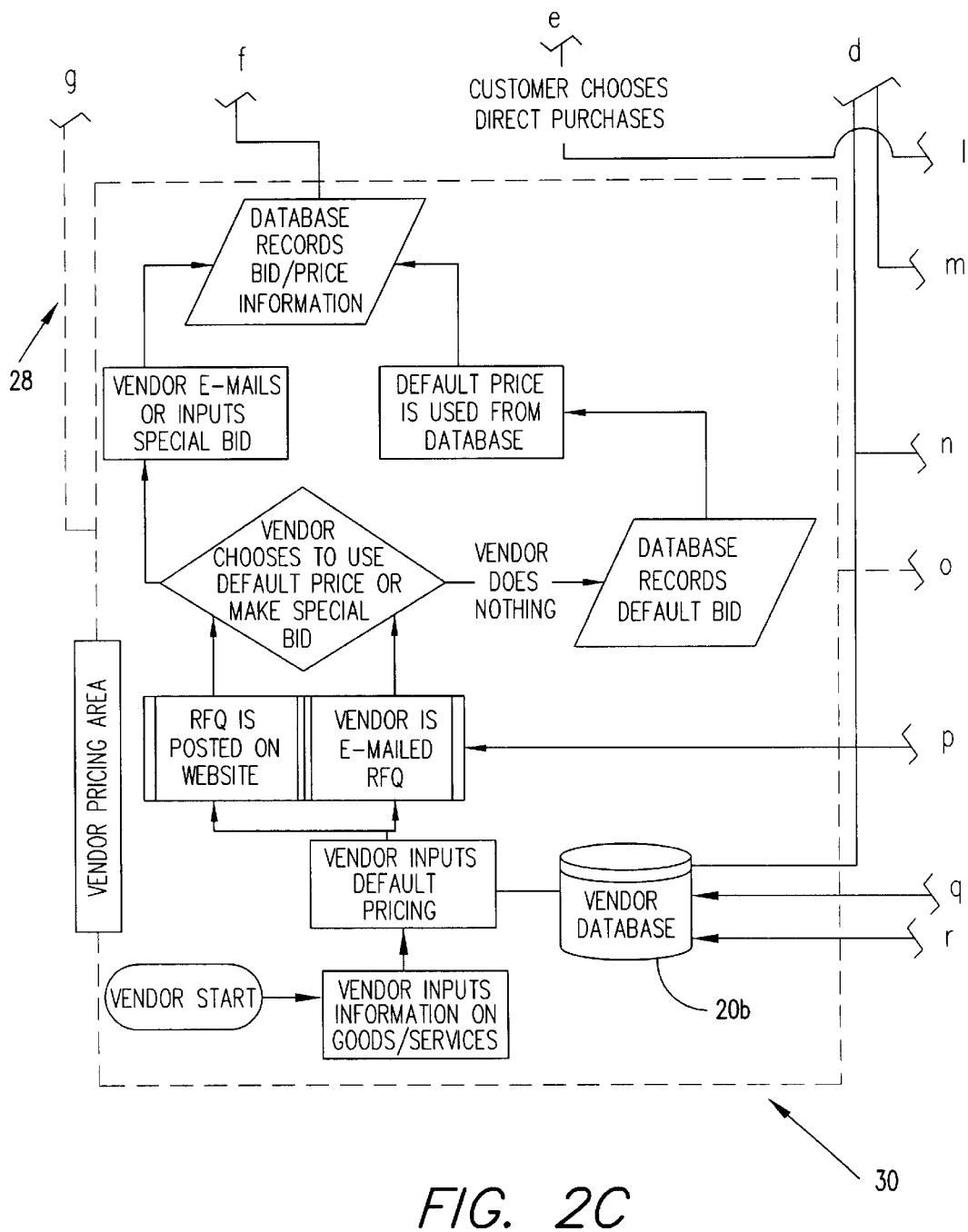
Figure 2D:
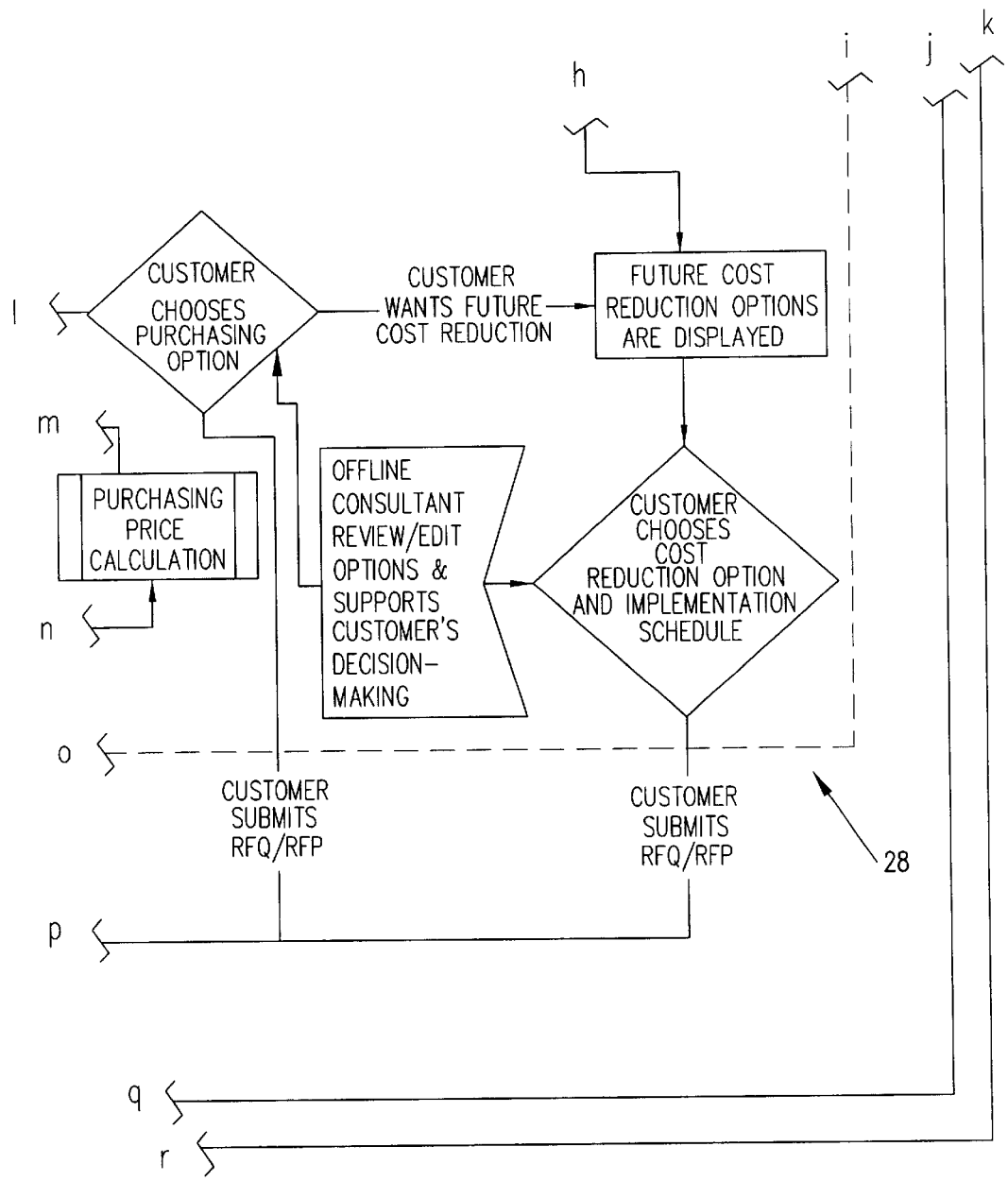

Vendor Purchasing Area (See "Vendor Purchasing Area" 30, FIG. 2C). The fifth step of the preferred process is e-mailing an RFQ and RFP to a system website. Anytime prior to this step, the vendor may input information relating to offered goods or services or other information relating to shipping, transportation, payment, billing, contact information, contracting, production, service capacity levels, or other information relevant to making sales.

Additionally, the vendor may also input default pricing anytime prior to the fifth step of the preferred process. For example, the vendor may use a rate schedule to automate bidding when the vendor wishes not to calculate a price directed specifically to a particular RFP. Calculation of a price directed to a particular RFP requires a vendor to enter fee information for particular goods and services being offered. Accordingly, a fee information may vary based on the applicable country, local government jurisdiction, and zip code. Default pricing allows a vendor to generate a bid without effort (e.g., generating pricing intended to develop specific markets in specific geographical areas). Alternatively, a vendor may generate a bid directed to a particular RFP, thereby overriding any default rate schedule.

The sixth step consists of choosing whether to use a default price or generate a special bid specifically directed to a particular RFP. If the vendor chooses to generate a special bid, the vendor will either e-mail the bid to the system server 18 or post the bid on the website. If the vendor fails to choose a bidding option within a given period of time, a default price used for generating a bid. The customer database 20a and vendor database 20b will then each record the bid price information in each of the two databases. The applicable bid is then displayed on a webpage and sent to the customer. If the customer chose to generate a special bid, default prices will be used to generate a list of items for the customer to buy.

Next, the customer chooses a vendor with whom to contract for desired goods or services. The customer then finalizes a contract agreement. The applicable purchasing information is then recorded in the customer and vendor databases.

Customers' Information Management Area (See "Customers Information Management Area" 32, FIG. 2B. In the Customer's Information Management Area 32, the Customer may view purchasing history; analyze purchasing cost efficiency and status of cost reduction tasks; forecast future purchasing needs; receive notices to make new purchases; export and import purchasing information; view cost reduction tasks, resources, timeframe, and targets for completion; input and update data; analyze progress; forecast future cost reductions; receive notices to conduct tasks; and, generate and transmit reports.

Import Purchasing Information. Purchasing information from vendors or from transaction made at other websites may be imported automatically or manually into the customer database 20a. After purchases are made at other websites, the purchasing information is sent to the system server 18 by the commerce website server 16 via e-mail, electronic data interchange (EDI), Adobe Acrobat portable, document file (.pdf), spreadsheet or database file format. This purchasing information is added to the customer's database of purchasing information from purchasing and cost reduction program tasks conducted on the system server's website.

One illustration of a situation where a vendor may need to import purchasing information is where charges to a particular customer are variable. For example, suppose a customer has entered into a 3-year contract with a glass recycler for picking up glass waste from the customer's work site. Further suppose that the glass recycler charges the customer by the ton for picking up glass waste. Assuming the 3-year contract had been formed through a bidding process (or direct purchase) on the system server's website, this would be an appropriate situation where the vendor would simply import applicable purchasing regarding the customer to calculate the charges to be billed to the customer.

Import Financial Information. Financial information is imported from the customer's records at financial institutions, e.g., banks. The financial information is imported in a secure, encrypted format to prevent persons other than the customer from accessing this information. The customer may use the financial information to develop tax reports for the government or for generating credit statements. For example, if a large purchase is about to be made or a credit line established, the financial information may be used as a credit reference in support of the transaction.

Purchasing and Cost Reduction Analysis and Forecasting. The cost effectiveness of purchases are analyzed based on a customer's purchasing history, assessment of the customer's purchasing need based on previous performances in the customer purchasing area 28, and cost reduction targets identified for the customer.

For example, suppose the customer has an office building, housing 1000 employees. Expert criteria indicates that waste generation from this facility is 50% paper and 2 lbs of trash/day*employee or 2000 lbs of trash/day. Based on findings by the cost reduction program, the customer chose to begin recycling 50% of its paper waste. After a bidding process, the customer contracted with an office paper recycler to pay $1.00/lb of paper waste. The customer also contracted with a waste collector to pay the collect $1000/ton. Assuming the customer fully implemented the office recycling plan, they would reduce waste by 25% and gain a revenue of $250.00, thereby resulting in a total payment of $500.00. Such a result would produce a savings of $500 by reducing a $1000 contractual obligation to $500. If based on imported purchasing information, the customer had only begun recycling 20% of their paper, the analysis would indicated that the customer had saved only $200 rather than $300 that could have been saved if the customer had recycled $500.

The basic formula for the abovementioned analysis for establishing savings potential is further_savings_potential [$300]=cost_reduction_target[$500]-(initial_purchasing [$1000]-current_purchasing [$800]). Forecasting reviews the cost reduction programs implementation schedule with the current status of implementation to forecast future period changes in purchasing and cost.

For example, in the above example, if the goal was to implement paper recycling by a recycling increase of 10% monthly (based on initial volumes) for 10 months, after 10 months all office paper would be recycled. After 5 months, the target goal of half of the paper waste would be recycled, thereby necessitating that the customer change its contract with the paper recycler to pick up additional paper waste.

Another illustration may be shown where a cost reduction program is being implemented. After switching to more energy efficient lighting, expert criteria could suggest ways of reducing the number of light bulbs ordered each year.

Still another illustration may be shown in preparation of tax reports. According to a preferred embodiment of the present invention, a customer may be presented with a cost reduction analysis report upon completing a tax form. For example, where a customer can claim certain tax deductions based of business trips expert criteria may be used to generate cost reduction options by placing purchasing information in appropriate sections of the tax form to enable the customer to realize a tax benefit.

Export Purchasing Information. Purchasing and cost reductions program information may be downloaded from the customer database 20a to the customer's own server for accounting, inventory, or other similar purposes.

Data Entry & Revision. As cost reduction programs are implemented and as purchases are made outside the internet network 26, the customer can go to their private information management screen and enter information regarding the purchases and the status of implementing their cost reduction task. For example, as recycling increases, the amount of waste collected will decrease, and data must be entered into the database.

Purchase Notices, Purchase Automation, and Completion Notices. The system server 18 notifies the customer via e-mail or an over the web facsimile of a need to make a purchase (e.g., when a contract expires or when a typical period between purchases has passed). Alternatively, the system server 18 may be set to, automatically make a purchase, whether by bidding or by direct purchase transaction. The system server 18 may also notify the customer by the aforementioned means of an approaching deadline to complete a cost reduction task. These notices and automations may be set to occur or not occur at a specified time prior to a scheduled deadline.

Report export. Reports may be exported to external servers, such as servers affiliated with government agencies. Reports may be generated from purchasing and financial information. For, example, in the case of tax filings, financial information related to income is input into an appropriate line of a tax form and purchasing information is categorized based on the type of expenditure (e.g., business start-up, capital investment, business expense, etc.) then totaled by type and entered into an appropriate line of a tax form. The tax form is preferably an Adobe Acrobat portable document file (i.e., .pdf), spreadsheet or database file format.

Another example involves waste management. Based on purchasing information for a quantity of waste and recycling. collection services, the system server 18 can complete an Adobe Acrobat portable document file (.pdf) or spreadsheet for waste generating and recycling. These forms are required by local and state government jurisdictions on an annual basis, typically. The customer may then print the forms, add data to the forms, or transmit the forms via a conventional communications medium, such as e-mail, facsimile, or EDI. The customer can also post the forms on a website, such as one residing on the system server 18. The customer can also down the forms in a spreadsheet, database, or .pdf file.

Interactive On-line Consultant. The Interactive On-line Consultant (hereinafter referred to as the "IOC") provides real-time on-line support for customers and vendors. Whenever forms are, being filled out, an interactive help desk will be present in the form of a split screen-one screen being used as a conventional chat room and the other screen containing a form to be filled out by the customer or vendor. The customer and vendor can ask for assistance at anytime.

The IOC has other features for improving efficiency. The customer or vendor may have the IOC active during the form processes, but the consultant will have its IOC pop-up whenever the customer or vendor rings a bell to notify the consultant of a need to have a question answered The consultant will have a repertoire of automated responses that can be used to respond to questions. In addition, the consult can write special response in the chat window. The consultant must be able to handle at least 5 customers or vendors at a time.

It is to be understood that the present invention is not limited to the embodiments described above, but encompasses any and all embodiments within the scope of the following claims.

I claim:

1. A system for transacting electronic commerce and related data management, analysis, and reporting, comprising:

a database communicatively connected to an internet network, said database storing a variety of information relating to customers, and having a cost reduction database portion for storing cost reduction information;

at least one first client communicatively connected to the internet network, said at least one first client having access to an on-line system;

at least one second client communicatively connected to the internet network, said at least one second client having access to the on-line system;

at least one first server communicatively connected to the internet network, said at least one first server maintaining a commercial website;

at least one second server communicatively connected to the internet network, said at least one second server supporting a consultant interface on the internet network;

a third server communicatively connected to the internet network, said third server importing financial information into said database;

a fourth server communicatively connected to the internet network, said fourth server receiving purchasing and financial information;

a computer readable filter program generating purchasing, options by filtering a customer's information and calculating a purchase price, the computer readable filter program residing on said at least one first server;

a first computer readable program dynamically displaying a list of cost reduction options tailored to an applicable class of customers, the first computer readable program residing on said at least one first server;

a second computer readable program analyzing a customer's purchasing history for cost effectiveness, and forecasting future improved purchasing implementation plans, the second computer readable program residing on said at least one first server; and a computer readable default pricing program selectively using default pricing values to generate a bid, the default pricing program residing on said at least one first server.

2. The system recited in claim 1, wherein said at least one first client is dedicated for use by a predetermined customer.

3. The system recited in claim 1, wherein said at least one second client is dedicated for use by a predetermined vendor.

4. The system recited in claim 1, wherein said third server is accessible by predetermined customers of a financial institution.

5. The system recited in claim 1, wherein said fourth server is dedicated to transmission of government-related matters.

6. The system recited in claim 1, wherein said computer readable filter program proposes improved energy efficiency purchasing options.

7. The system recited in claim 1, wherein said computer readable filter program generates cost reduction options by placing purchasing information in appropriate sections of a tax form for achieving a tax benefit.

8. The system recited in claim 1, wherein said computer readable filter program suggests cost reduction options for reducing cost associated with waste.

9. The system recited in claim 1 further comprising a third computer readable program generating reports from purchasing and financial information, the third computer readable program residing on said at least one first server.

* * * * *